(12) United States Patent
Kato

(10) Patent No.: US 8,000,019 B2
(45) Date of Patent: Aug. 16, 2011

(54) OPTICAL SYSTEM FOR A DISPLAY PANEL USING DIVIDED IRRADIATION

(75) Inventor: Atsushi Kato, Tokyo (JP)

(73) Assignee: NEC Viewtechnology, Ltd., Tokyo (JP)

(*) Notice: Subject to any disclaimer, the term of this patent is extended or adjusted under 35 U.S.C. 154(b) by 1379 days.

(21) Appl. No.: 11/341,710

(22) Filed: Jan. 30, 2006

(65) Prior Publication Data

US 2006/0170873 A1    Aug. 3, 2006

(30) Foreign Application Priority Data

Jan. 31, 2005    (JP) .................................. 2005-023482

(51) Int. Cl.
*G02B 27/14*    (2006.01)
*G03B 21/26*    (2006.01)

(52) U.S. Cl. ............. 359/629; 359/634; 353/34; 353/33

(58) Field of Classification Search .................. 359/618, 359/629–640; 353/33–34; 398/42, 153
See application file for complete search history.

(56) References Cited

U.S. PATENT DOCUMENTS

| | | | |
|---|---|---|---|
| 6,334,685 B1 * | 1/2002 | Slobodin | 353/31 |
| 6,827,450 B1 | 12/2004 | McGettigan et al. | |
| 6,856,720 B2 * | 2/2005 | Baugh | 385/22 |
| 7,168,811 B2 * | 1/2007 | Kojima | 353/81 |

FOREIGN PATENT DOCUMENTS

| | | |
|---|---|---|
| JP | 04-316296 | 11/1992 |
| JP | 9-512648 | 2/1996 |
| JP | 2001-337286 | 12/2001 |
| JP | 2001-350112 | 12/2001 |
| JP | 2001-356286 | 12/2001 |
| JP | 2001-356287 | 12/2001 |
| JP | 2002-072966 | 3/2002 |
| JP | 2002-207184 | 7/2002 |
| JP | 2002-328332 | 11/2002 |
| JP | 2003-015217 | 1/2003 |
| JP | 2003-241193 | 8/2003 |
| JP | 2003-307777 | 10/2003 |
| JP | 2004-139017 | 5/2004 |
| JP | 2004-170549 | 6/2004 |
| JP | 2004-325533 | 11/2004 |

OTHER PUBLICATIONS

Hecht, Eugene. Optics. Reading, MA: Addison-Wesley, 1998. Print.*
Japanese Office Action dated Aug. 15, 2007 with partial English translation.

* cited by examiner

*Primary Examiner* — Darryl J Collins
*Assistant Examiner* — Zachary Wilkes
(74) *Attorney, Agent, or Firm* — McGinn Intellectual Property Law Group, PLLC

(57) ABSTRACT

An optical system for a display panel is disclosed. An optical system comprises a color separating portion for separating light that is emitted from a light source into a plurality of beams having different spectra; and a projecting portion for projecting the plurality of beams onto a plurality of divided areas of a predetermined range in the display panel, while sequentially switching the plurality of beams.

26 Claims, 14 Drawing Sheets

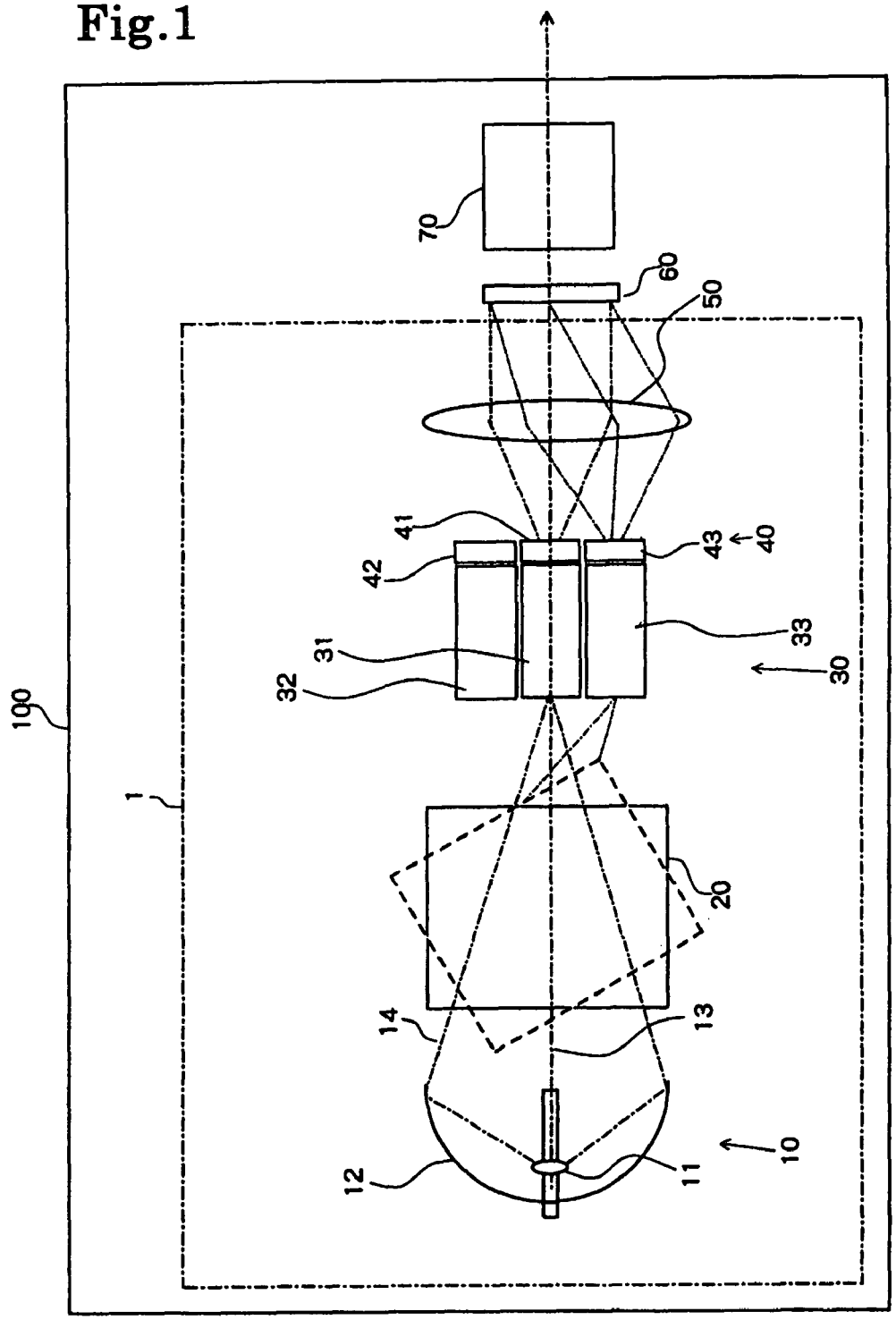

Fig.15
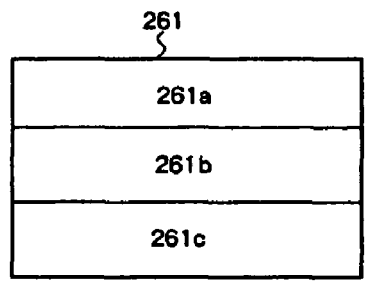
Fig.16
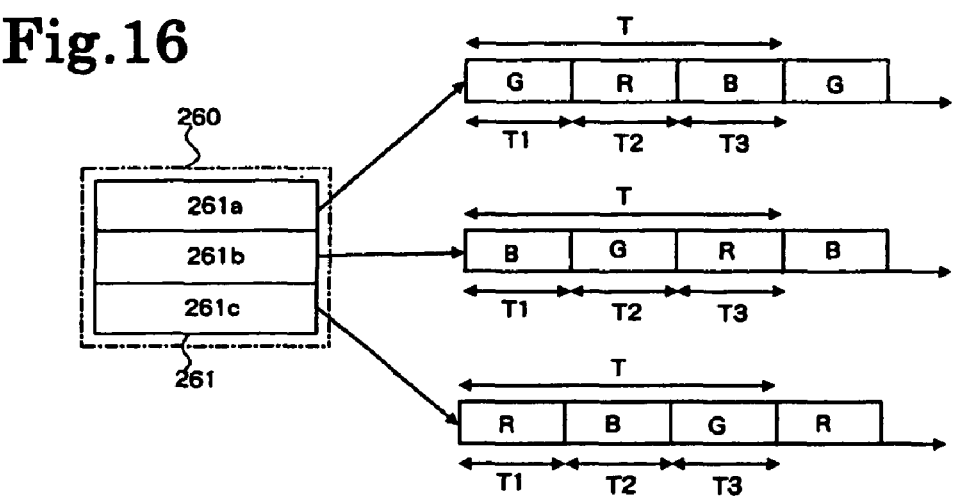
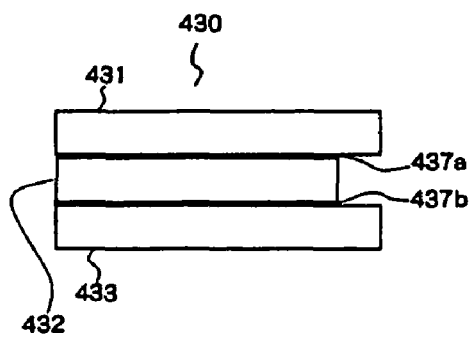
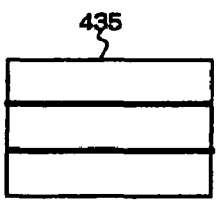
Fig.17A    Fig.17B

OPTICAL SYSTEM FOR A DISPLAY PANEL USING DIVIDED IRRADIATION

BACKGROUND OF THE INVENTION

1. Field of the Invention

The present invention relates to an optical system for a display panel, and a projector having the optical system. More particularly, the present invention relates to an optical system for a display panel for projecting red, green, and blue beams of a light source with high efficiency for light utilization.

2. Description of the Related Art

In conventional projectors using sequential color system, three lights of the primary colors, i.e., red (hereinafter, R), green (hereinafter, G), and blue (hereinafter, B) lights are sequentially projected onto a high response display panel by means of a color wheel that rotates at a high speed. A field image in each color is sequentially displayed, and a full color frame is displayed through the afterimage of human eyes. This kind of projector has the advantage that size, weight, and cost can be reduced easily because of the configuration of single display panel and a simple optical system. DMD (Digital Micro-mirror Device) is a known display panel. In a DMD, which is a binary-type device having only two states of ON and OFF, gradations of colors is controlled by controlling duties of ON/OFF through PWM (Pulse Width Modulation).

However, the optical system using a color wheel has the disadvantage that only one color can be used at one time, and two-thirds of light that is emitted from a light source is lost without being projected onto a display panel, resulting in the difficulty in improving brightness. If three primary colors of R, G, B into which white light of the light source is separated are used efficiently in a sequential color displaying process using a single display panel, it is possible to provide a projector with high brightness.

According to a disclosed optical system that addresses this requirement, light that is emitted from a light source is separated into color bands of R, G, B and a display panel is scanned with the color bands by continuously moving the color bands by means of a rotatable prism. See, for example, U.S. Pat. No. 5,410,370, and No. 5,528,318, Japanese Patent Laid-open Publication No. 2003-149738, and Japanese Patent No. 3352100. This system, called a scroll system, is considered to provide a projector with high efficiency for light utilization, because color beams of R, G, B which originate from the light source can be utilized simultaneously.

In conventional optical systems for a projector of a time-division type that uses a disk-shaped color wheel with color filters, out of the whole light consisting of color beams of R, G, B, approximately two-thirds can not be utilized simultaneously, as described above.

In the prior art scroll system disclosed in the above documents, in which color bands move continuously on a display panel, the color bands are narrow in width, and timing at which each color is switched differs for each pixel row. Therefore, a display panel driving circuit needs to be driven by a signal which is synchronized with color beams that has different switching timing for each pixel row. Further, each color band is projected onto a portion of the display panel only in a limited time, which makes it difficult to achieve sufficient gradations by the PWM. This means, in turn, that significantly complicated PWM control is required, and a heavy load is burdened on the signal processing circuit.

SUMMARY OF THE INVENTION

It is an object of the present invention to provide a novel optical system for a display panel with a smaller burden on the signal processing circuit, high efficiency for utilizing the light of a light source, and high brightness. It is also an object of the present invention to provide a projector having such an optical system.

According to one embodiment of the present invention, an optical system for a display panel comprises a color separating portion for separating light that is emitted from a light source into a plurality of beams having different spectra; and a projecting portion for projecting the plurality of beams onto a plurality of divided areas of a predetermined range in the display panel, while sequentially switching the plurality of beams.

In one embodiment, the optical system for the display panel may further comprise the light source. The color separating portion may comprise: a plurality of light introducing members each for emitting the light that is incident from the light source through an emitting surface; a selecting portion that is arranged on an optical path between the light source and the plurality of light introducing members, for selecting one of the light introducing members and for causing the light to be incident on the selected light introducing member; and a plurality of color separating members which are arranged on the emitting surfaces of the light introducing members, for separating the light into the plurality of beams. The projecting portion may further comprise a projecting means for projecting the beams which are emitted from color separating members onto the plurality of divided areas.

According to still another embodiment, each beam may have a rectangular cross-section in a plane perpendicular to a direction that the beam travels, and each beam may be emitted such that the beam borders on a longer side of an adjacent beam, and such that the plurality of beams have a different spectra order depending on the color separating members.

In the optical system for the display panel, the plurality of beams may comprise a beam of red, a beam of green, and a beam of blue.

As described above, light from a light source is separated into color beams of R, G, B in rectangular shapes. The color beams are projected onto divided areas (for example, three divided areas) of a display panel such that one color beam is not projected onto more than one area simultaneously and such that the color beam that is incident on each area is periodically switched, resulting in the efficient use of light that is emitted from the light source and incident on a display panel.

According to still another embodiment, the optical system for the display panel further comprises the light source. The color separating portion comprises: a color separating means for separating the light that is emitted from the light source into the plurality of beams; a light introducing portion which has a plurality of light introducing members each for emitting the beam through an emitting surface, the beam being emitted from the color separating means and incident on the light introducing member; a selecting portion that is arranged on an optical path between the light source and the light introducing portion, for causing the plurality of beams which are emitted from the color separating portion incident on the light introducing members; and a projecting portion for projecting the beams which are emitted from the light introducing portion on a predetermined range of the display panel.

As will be appreciated from the description above, in the optical system for a display panel according to the present invention, light that is emitted from a light source is separated into color beams in rectangular shapes, then each color band is projected onto each rectangular area of the display panel in a manner that the arrangement order of colors sequentially changes. The number of the divided areas is set equal to that of color bands. Thus, high efficiency for light utilization of the light source can be achieved. The divided areas of the display panel area are sequentially irradiated by each color beam. Accordingly, a smaller burden is placed on the signal processing circuit in the display panel, compared with a scroll-type system in which the boundaries of the color beams continuously move on the display panel.

The above and other objects, features and advantages of the present invention will become apparent from the following description with reference to the accompanying drawings which illustrate examples of the present invention.

BRIEF DESCRIPTION OF THE DRAWINGS

FIG. 1 is a schematic diaphragm of an optical system according to the first embodiment of the present invention and a projector provided with the optical system;

FIG. 15 is a schematic view of divided areas in a display area of a display panel according to the third embodiment;

FIG. 16 is a schematic view explaining the time-dependent change in the color of beams which are projected onto a display area in a display panel according to the third embodiment;

FIG. 17A is a schematic side view showing rod integrators of a light introducing portion according to a modified third embodiment;

FIG. 17B is a schematic front view showing rod integrators of a light introducing portion according to a modified third embodiment;

DESCRIPTION OF THE PREFERRED EMBODIMENTS

Figure 2A:
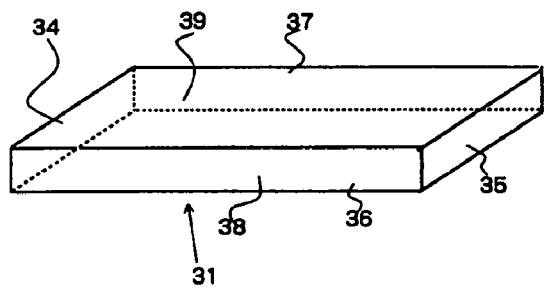
FIG. 2A is a perspective view of a rod integrator.
Figure 2B:
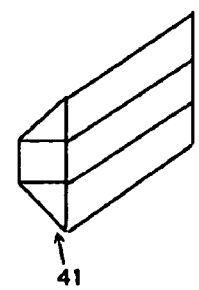
FIG. 2B is a perspective view of a color separating member.

The present invention provides an optical system for a display panel of a single plate type, with high light efficiency and a smaller burden on the signal processing circuit of a display panel. The present invention is different from a system in which rectangular bands of particular wavelength ranges (hereinafter called color bands), each consisting of a different color beam, continuously move on a display panel, such as a scroll type. The present invention is characterized in that rectangular color bands of R, G, B into which light from a light source is separated are projected onto divided areas (for example, three areas) of a display panel such that one color beam is not projected onto more than one divided area simultaneously, and such that the color beam that is projected onto each area sequentially changes. R refers to a color having the center of the spectrum in a red area, G is a color having the center of the spectrum in a green area, and B is a color having the center of the spectrum in a blue area. An optical system according to the present invention provides as high efficiency for light utilization as a scroll system, with a smaller burden on the signal processing circuit. In the following description, a display panel is divided into three areas and three color bands of R, G, B are utilized, but the present invention is not limited to such a configuration. A similar design is possible for different colors or for a different number of areas. Each light beam has, but is not limited, to in the present invention, a rectangular cross section.

Next, explanation will be given of the first embodiment according to the present invention. Referring to FIG. 1, optical system 1 includes light source portion 10, rotatable prism 20, light introducing portion 30, color separating portion 40, and illumination lens 50. Light source portion 10 includes light source 11 which projects beam 14, and reflector 12 which makes beam 14 converge at a predetermined position on optical axis 13. Rotatable prism 20 causes beam 14 selectively to be incident on light introducing portion 30. Light introducing portion 30, which functions as light introducing means, includes first rod integrator 31, second rod integrator 32, and third rod integrator 33 serving as light introducing members. Color separating portion 40, which functions as color separating means, includes first color separating member 41, second color separating member 42, and third color separating member 43, each integrated with rod integrator 31, 32, and 33, respectively. Illumination lens 50 makes beam 14, which is emitted from each color separating member 41, 42, and 43 in color separating portion 40, converge on the entire display area of display panel 60.

Light source 11 may be, but is not limited to, a high-pressure mercury lamp for emitting a white light beam having a high brightness. Light source 11 is combined with reflector 12. Reflector 12 has an oval mirror to generate a converged beam. Light source 11 is positioned near the first focal point of the oval mirror, so that beam 14 that is emitted from light source 11 is focused near the second focal point. A reflector with a parabolic surface may also be used. In this case, a convex lens with a desired focal length may be arranged just ahead of the reflector in order to make the beam converge near the focal point of the convex lens, because if the light source is arranged near the focal point of the parabolic mirror, then the light that is emitted from the light source and that is reflected by the parabolic mirror becomes approximately parallel.

Figure 2C:
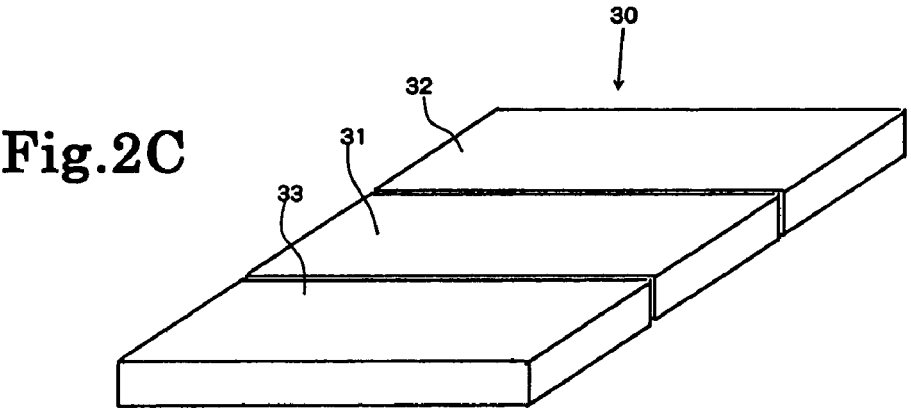
FIG. 2C is a perspective view of a light introducing portion.
Figure 3:
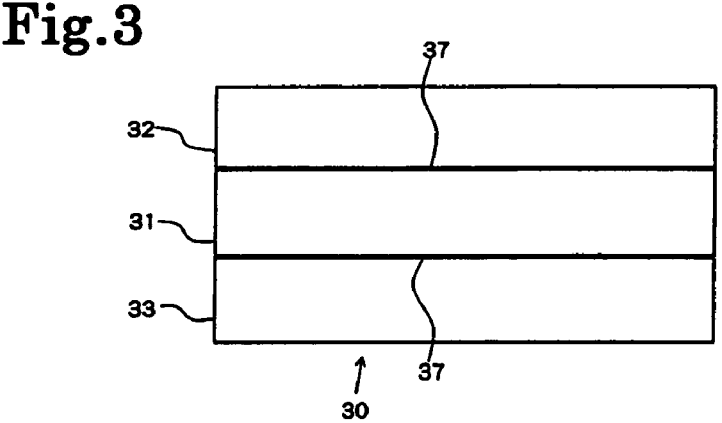
FIG. 3 is a top view of a rod integrator according to the first embodiment.

Light introducing portion 30 that includes the light introducing members i.e., first rod integrator 31, second rod integrator 32, and third rod integrator 33 is arranged near the convergent point of the beam that is emitted from light source 11 and reflector 12. The light introducing members are not limited to rod integrators, and any elements that are able to emit light with uniform brightness distribution may be used. Referring to FIG. 2A, a rod integrator is an optical element in a rectangular parallelepiped made of optical glass, having incident surface 34, emitting surface 35, and four sides 36, 37, 38, 39. Both surfaces 34, 35 are ground. Preferably, rod integrators 31, 32, 33 are made of the same material and have the same shape. Three rod integrators 31, 32, 33, as shown in FIGS. 2C and 3, are preferably arranged in the relative spatial relationship in which the incident surfaces are positioned on the same plane and spaced apart from each other.

Alternatively, rod integrators 31, 32, 33 may be combined together instead of being separated by air. In some embodiments, rod integrators 31, 32, 33 are adhered together with reflective films coated therebetween to form reflective surfaces on adhered surface 37, as shown in FIG. 3.

Referring to FIG. 1, first color separating member 41, second color separating member 42, and third color separating member 43 are arranged just ahead of emitting surfaces 35 of first rod integrator 31, second rod integrator 32, and third rod integrator 33, respectively. Each color separating member is integrated with the corresponding rod integrator.

Figure 4:
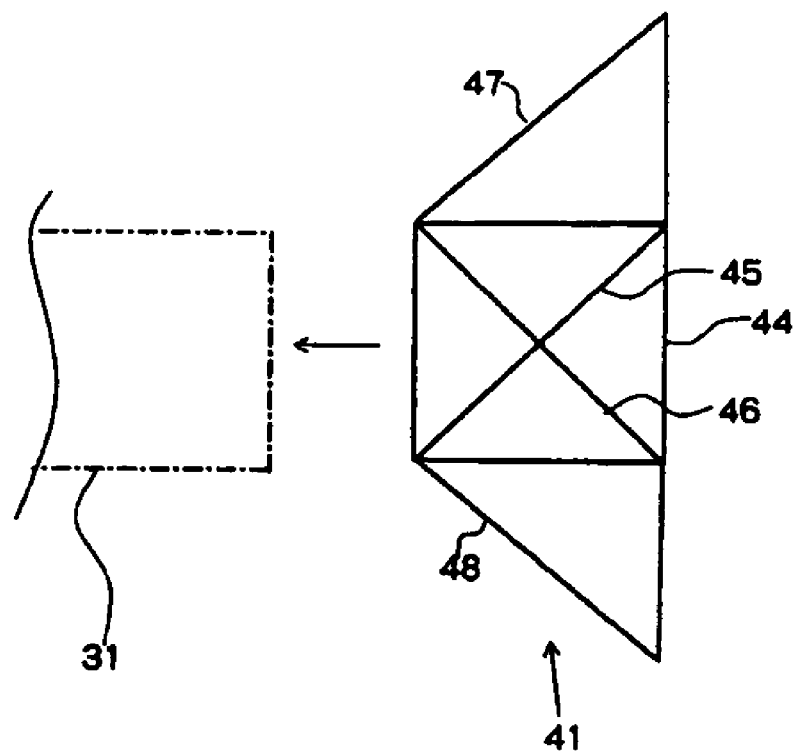
FIG. 4 is a schematic side view of a color separating member in a color separating portion according to the first embodiment.
Figure 5A:
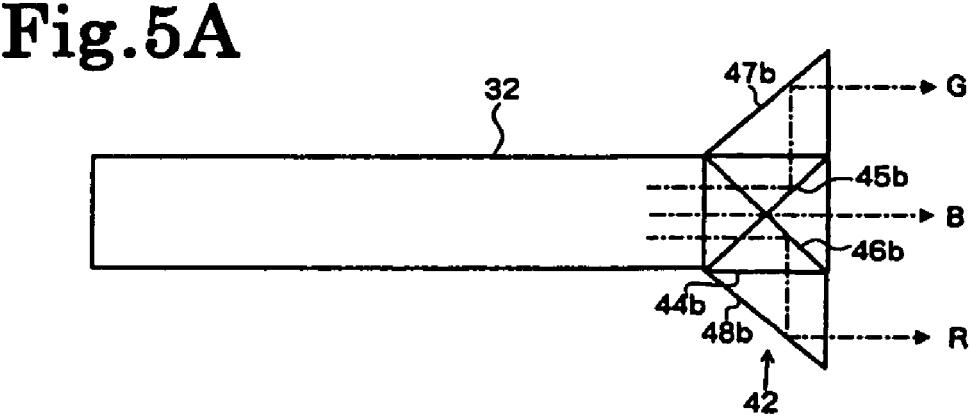
FIG. 5A is a schematic side view of a second rod integrator according to the first embodiment.
Figure 5B:
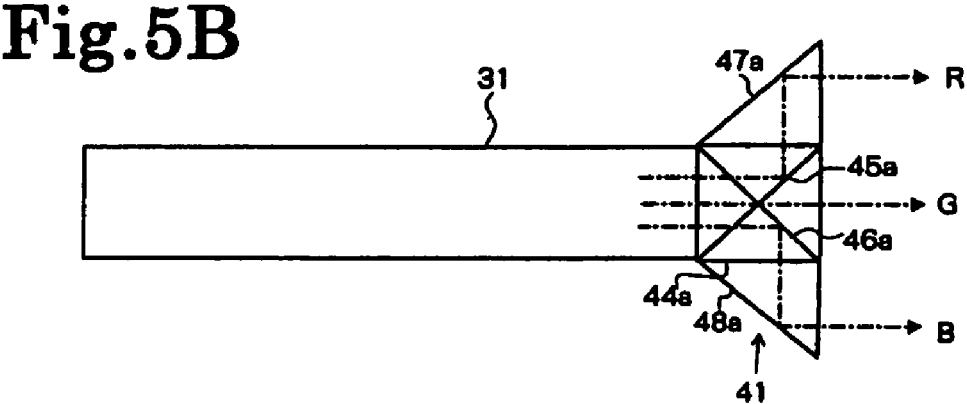
FIG. 5B is a schematic side view of a first rod integrator according to the first embodiment.
Figure 5C:
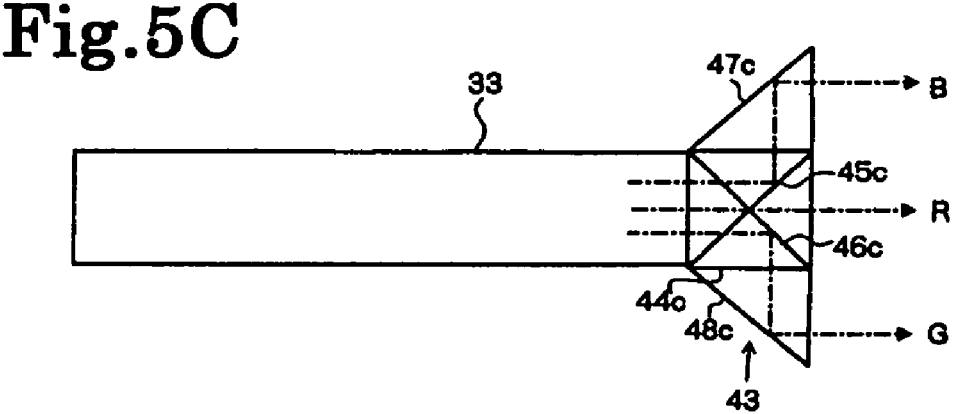
FIG. 5C is a schematic side view of a third rod integrator according to the first embodiment.

Referring to FIG. 4, each color separating member 41, 42, 43 consists of dichroic prism 44 and two rectangular prisms, i.e., first rectangular prism 47 and second rectangular prism 48. Dichroic prism 44 is a cross dichroic prism in which first dielectric multi-layer film 45 and second dielectric multi-layer film 46 are arranged in an X-shape. Dichroic prism 44 can be manufactured by a method in the art. In this embodiment, each color separating member 41, 42, 43 employs dielectric multi-layer films 45, 46 having transmission and reflectance characteristics which are different from each other, as shown in FIG. 5.

In dichroic prism 44a of first separation member 41, first dielectric multi-layer film 45a allows the beam of G to be transmitted and reflects the beam of R. The beam of R is reflected by first rectangle prism 47a to be emitted to the outside. Second dielectric multi-layer film 46a allows the beam of G to be transmitted and reflects the beam of B. The beam of B is reflected by second rectangle prism 48a to be emitted to the outside. Thus, the color bands of R, G, B are formed in this order from top to bottom in the figure. Dielectric multi-layer film 45a is designed to allow the beam of G to be transmitted and reflects the beam of R, and dielectric multi-layer film 46a is designed to allow the beam of G to be transmitted and reflects the beam of B.

In dichroic prism 44b of second separation member 42, first dielectric multi-layer film 45b allows the beam of B to be transmitted and reflects the beam of G. The beam of G is reflected by first rectangle prism 47b to be emitted to the outside. Second dielectric multi-layer film 46b allows the beam of B to be transmitted and reflects the beam of R. The beam of R is reflected by second rectangle prism 48b to be emitted to the outside. Thus, the color bands of G, B, R are formed in this order from top to bottom in the figure. Dielectric multi-layer film 45b is designed to allow the beam of B to be transmitted and reflects the beam of G, and dielectric multi-layer film 46b is designed to allow the beam of B to be transmitted and reflects the beam of R.

In dichroic prism 44c of third separation member 43, first dielectric multi-layer film 45c allows the beam of R to be transmitted and reflects the beam of B. The beam of B is reflected by first rectangle prism 47c to be emitted to the outside. Second dielectric multi-layer film 46c allows the beam of R to be transmitted and reflects the beam of G. The beam of G is reflected by second rectangle prism 48c to be emitted to the outside. Thus, the color bands of B, R, G are formed in this order from top to bottom in the figure. Dielectric multi-layer film 45c is designed to allow the beam of R to be transmitted and reflects the beam of B, and dielectric multi-layer film 46c is designed to allow the beam of R to be transmitted and reflects the beam of G. In this manner, the color bands which are formed by three color separating members 41, 42, 43 are arranged in a different order from each other.

The configuration of color separating members is not limited to the embodiment mentioned above, and any configurations may be used which are capable of separating a white light beam into color bands of three colors. For example, two dichroic prisms and a mirror may be combined in a line.

Referring back to FIG. 1, illumination lens 50 is arranged ahead of color separating portion 40. Illumination lens 50 projects the color bands which are formed in color separating portion 40 onto display panel 60. In this embodiment, the color beams which are emitted from color separating members 41, 42, 43 of color separating portion 40 are incident on, but is not limited to, the entire surface of the predetermined range in display panel 60, as shown in FIG. 1.

Display panel 60 may be, in addition to a transmission-type liquid crystal panel of a single plate, a reflective display panel such as DMD or LCoS (Liquid Crystal on Silicon), which will be explained later with reference to FIGS. 20A and 20B.

Rotatable prism 20 is arranged between light source portion 10 and light introducing portion 30. Rotatable prism 20 causes the converged beam that is emitted from light source 11 selectively and sequentially incident on each rod integrators 31, 32, 33. However, the projecting portion is not limited to rotatable prism 20 of this embodiment, and any means may be used that is capable of allowing beam 14 emitted from light source 11 to be selectively and sequentially incident on rod integrators 31, 32, 33. Rotatable prism 20 may be a polygon, as well as a cubic, and is preferably made of optical glass. Rotatable prism 20 is a known art, and may be coupled to a motor in order to be rotated at high speed.

Next, explanation will be given of the operation of optical system 1. As shown in FIG. 1, beam 14 of while light that is emitted from light source 11 converges at a predetermined position on optical axis 13 by means of reflector 12 that has an oval surface. As described above, the beam converges near the second focal point of the oval mirror. Beam 14 is not limited to white light, and any lights may be used that can be separated into desired color beams. Beam 14, when not biased, is incident on first rod integrator 31 that is arranged near the convergent point. The converged beam emitted from light source 11 is periodically and selectively incident on one of three rod integrators 31, 32, 33 through the rotation of rotatable prism 20 that is arranged between light source portion 10 and rod integrators 31, 32, 33. Specifically, optical axis 13 of the converged beam emitted from light source 11 is biased by rotatable prism 20, and the converged beam is incident on second rod integrator 32 and third rod integrator 33 as well, which have incident surfaces 34 adjacent to and in the same plane as first rod integrator 31. In this way, the rod integrator on which the converged beam is incident, is switched each time optical axis 13 crosses the boundary between adjacent two rod integrators.

Figure 6A:
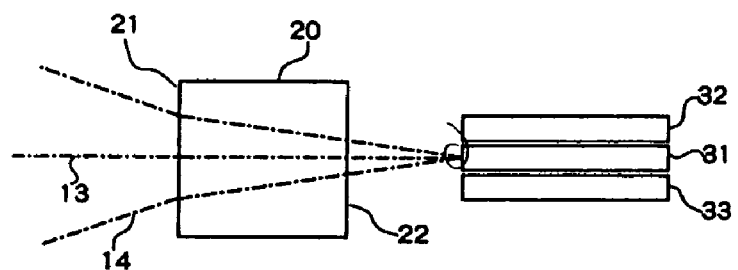
FIGS. 6A, 6B, and 6C are schematic views showing the relationships between the rotating angle of a rotatable prism and the incident point of a converged beam on rod integrators.
Figure 6B:
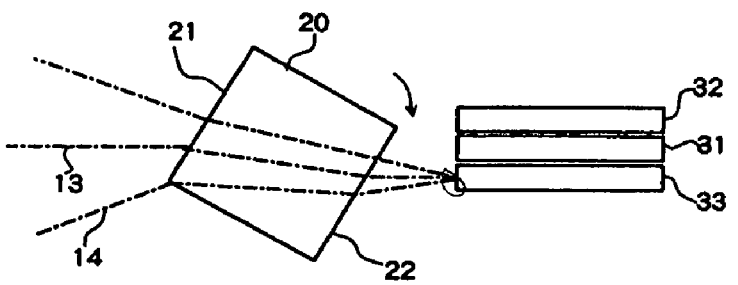
Figure 6C:
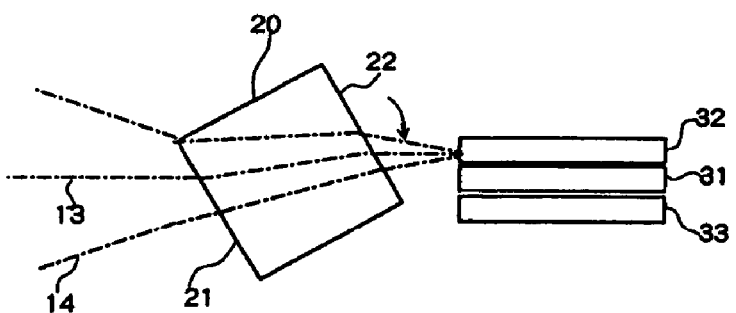

As shown in FIG. 6A, when optical axis 13 of light source 11 is perpendicular to incident surface 21 of rotatable prism 20, optical axis 13 is not biased. Accordingly, beam 14 is incident on first rod integrator 31 that is arranged in the middle. When rotatable prism 20 rotates clockwise, the angle of refraction of beam 14 at both incident surface 21 and emitting surface 22 of rotatable prism 20 is affected, thus optical axis 13 and beam 14 are generally biased downward. Consequently, as shown by the dashed lines in FIGS. 1 and 6B, the convergent point of beam 14 is shifted downward, and beam 14 that is emitted from light source 11 is incident on third rod integrator 33. When rotatable prism 20 rotates further, beam 14, in turn, is incident on second rod integrator 32. Specifically, as shown in FIG. 6C, optical axis 13 is biased upward, and the convergent point of beam 14 is shifted to incident surface 34 of second rod integrator 32. When rotatable prism 20 rotates further, the convergent point returns to the position shown in FIG. 6A. In this way, converged beam 14 emitted from light source 11A is incident on one of three rod integrators 31, 32, 33 in accordance with the rotation of rotatable prism 22. Scanning by rotatable prism 20 is preferably performed at a substantially constant speed. For that purpose, the rotation axis is preferably positioned at the center of rotatable prism 20, and rotatable prism 20 is preferably rotated at a constant speed.

The beam that is incident on rod integrators 31, 32, 33 advances toward emitting surface 35 while repeating the internal reflections that are inside rod integrators 31, 32, 33 on which the beam is incident. Ununiformity in brightness of light source 11 is eliminated in the process of transmitting of light, and uniform brightness distribution of the beam can be achieved at emitting surface 35. The uniform beam is incident on color separating members 41, 42, 43 of color separating portion 40 which are integrated with rod integrators, just after the beam is emitted from rod integrators 31, 32, 33. The uniform beam is then separated into color bands of R, G, and B. For example, referring to FIG. 5B, beam 14 that is incident on first rod integrator 31, after being emitted from rod integrator 31, is separated into the color beams of R, G, B, by means of cross dichroic prism 44a in color separating member 41, which is provided with dielectric multi-layer film 45a that allows the beam of G to be transmitted and reflects the beam of B, and dielectric multi-layer film 46a that allows the beam of G to be transmitted and reflects the beam of R. Color bands of R, G, B are formed in this order from top to bottom on emitting surface 35 of first rod integrator 31. The color bands have an uniform brightness distribution. Dichroic prism 44 and rectangle prisms 47, 48 are preferably shaped such that each color band corresponds to each divided area of the display area, which occupies one third of the display area of display panel 60. Similarly, color bands of G, B, R are formed in this order from top to bottom on the emitting surface of second color separating member 42, with uniform brightness distribution. Color bands of B, R, G are formed in this order from top to bottom on the emitting surface of third color separating member 43, with uniform brightness distribution. In this way, the color bands formed on each emitting surface of three color separating members 41, 42, 43 are arranged in different orders. The color bands are projected onto the display area of display panel 60 through illumination lens 50.

Figure 7A:
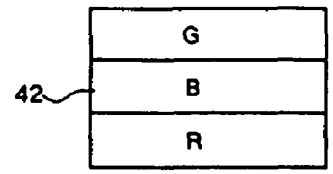
FIGS. 7A, 7B, and 7C are schematic views showing arrangements of color bands on the emitting surfaces of color separating members.
Figure 7B:
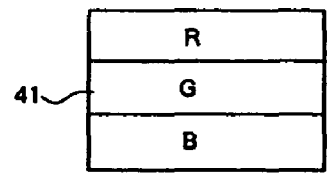
Figure 7C:
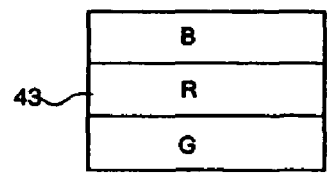

The color beams emitted from the emitting surface of second color separating member 42 are projected onto display panel 60 as color bands in the order of G, B, R from top to bottom, as shown in FIG. 7A. The color beams emitted from the emitting surface of first color separating member 41 are projected onto display panel 60 as color bands in the order of R, G, B from top to bottom, as shown in FIG. 7B. The color beams emitted from the emitting surface of third color separating member 43 are projected onto display panel 60 as color bands in the order of B, R, G from top to bottom, as shown in FIG. 7C.

Which color separating member 41, 42, 43 the beam is incident on depends on which rod integrators 31, 32, 33, to which the color separating members are attached, beam 14 is incident on. Accordingly, the color bands which are projected onto display panel 60 through illumination lens 50 are switched in a sequential and time-divisional manner, in accordance with the switching of the beam that is selectively incident on rod integrators 31, 32, 33 through the rotation of rotatable prism 20.

Figure 8:
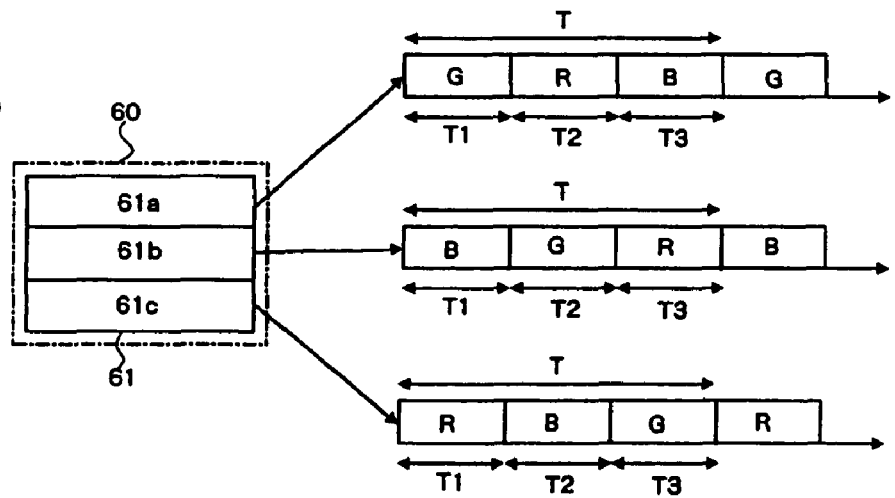
FIG. 8 is a schematic view explaining the time-dependent change in the color of beams which are projected onto a display area of a display panel according to the first embodiment.

Referring to FIG. 8, a time for displaying one frame of a picture is represented by T, and times for displaying sub-frames are represented by T1, T2, and T3. The color of the beams which are projected onto first display area 61a of display panel 60 is G during time T1, R during time T2, and B during time T3, respectively. In other words, color beams are repeatedly switched in the order of G, R, B, G, R, B. Similarly, color beams are repeatedly projected onto second display area 61b in the order of B, G, R, B, G, R, and color beams are projected onto third display area 61c in the order of R, B, G, R, B, G. Each sub-frame is projected by any one of color beams of R, G, B at any one time, and the color of the beam that is projected onto each divided area 61a, 61b, and 61c in display area 61 of display panel 60 sequentially changes. Accordingly, all the beam that is generated by light source 11 is used to illuminate display panel 60 without being wasted at any time, resulting in sufficiently high efficiency for light utilization. Moreover, the light in the form of color bands which are formed by rod integrators 31, 32, 33 is projected onto display panel 60 with uniform brightness, allowing images to be enlarged and projected through projection lens 50 with uniform brightness and with high quality. Rotatable prism 20 is rotated at a predetermined speed, and the timing for projecting the color beams on first area 61a, second area 61b, and third area 61c in display area 61 and the timing for driving display panel 60 are synchronized. Thus, full color images are displayed.

In this embodiment, the color bands are switched in each divided areas 61a, 61b, and 61c, ensuring sufficient time for displaying images during each sub-frame time. Since the color of each divided area remains unchanged during each sub-frame time, it is possible to achieve sufficient gradations of color without complicated PWM control. As a result, high quality images can be displayed with a smaller burden on the signal processing circuit.

Needless to say, projector 100 with projection lens 70 for enlarging the image on display panel 60 can be provided as well. Projector 100 has sufficient brightness and high efficiency for light utilization.

Next, explanation will be given of an optical system of the second embodiment according to the present invention. The second embodiment is a modification of the first embodiment. Configuration and operations are similar to those of the first embodiment except for light introducing portion 30 and color separating portion 40, and detailed explanation of the similar portions will be omitted.

In this embodiment, light introducing portion 130 has three rod integrators 131, 132, 133, similar to the first embodiment. However, the design of incident surface 134 differs from that of the first embodiment. Dichroic filters 144, 145, 146, which constitute color separating portion 140, are formed on emitting surfaces 135 such that each dichroic filter is integrated with the respective rod integrator. In other words, the light introducing portion is a light introducing means that is combined with a color separating portion, and therefore, color separating members are not separate elements.

Figure 9A:
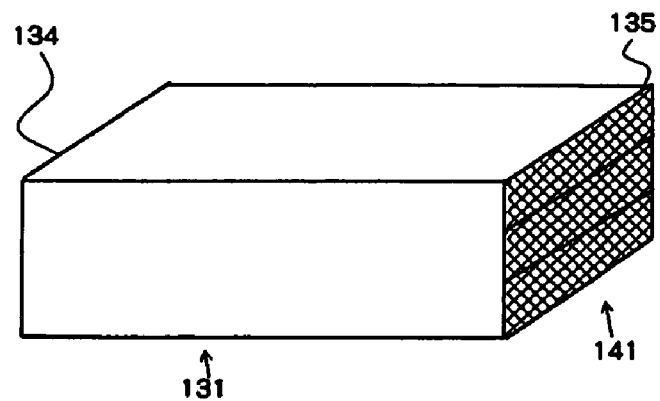
FIG. 9A is a schematic perspective view of a light introducing portion and a color separating portion according to the second embodiment.
Figure 9B:
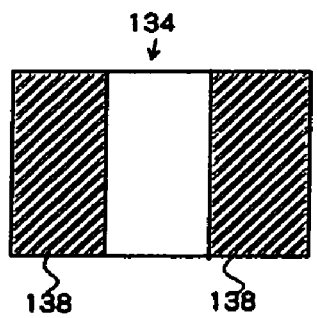
FIG. 9B is a side view of an incident surface.
Figure 9C:
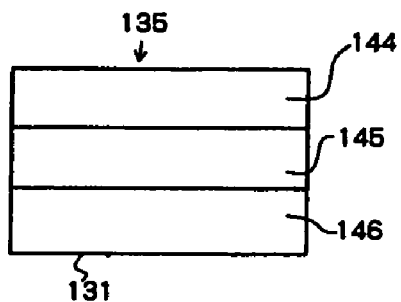
FIG. 9C is a side view of an emitting surface.
Figure 10:
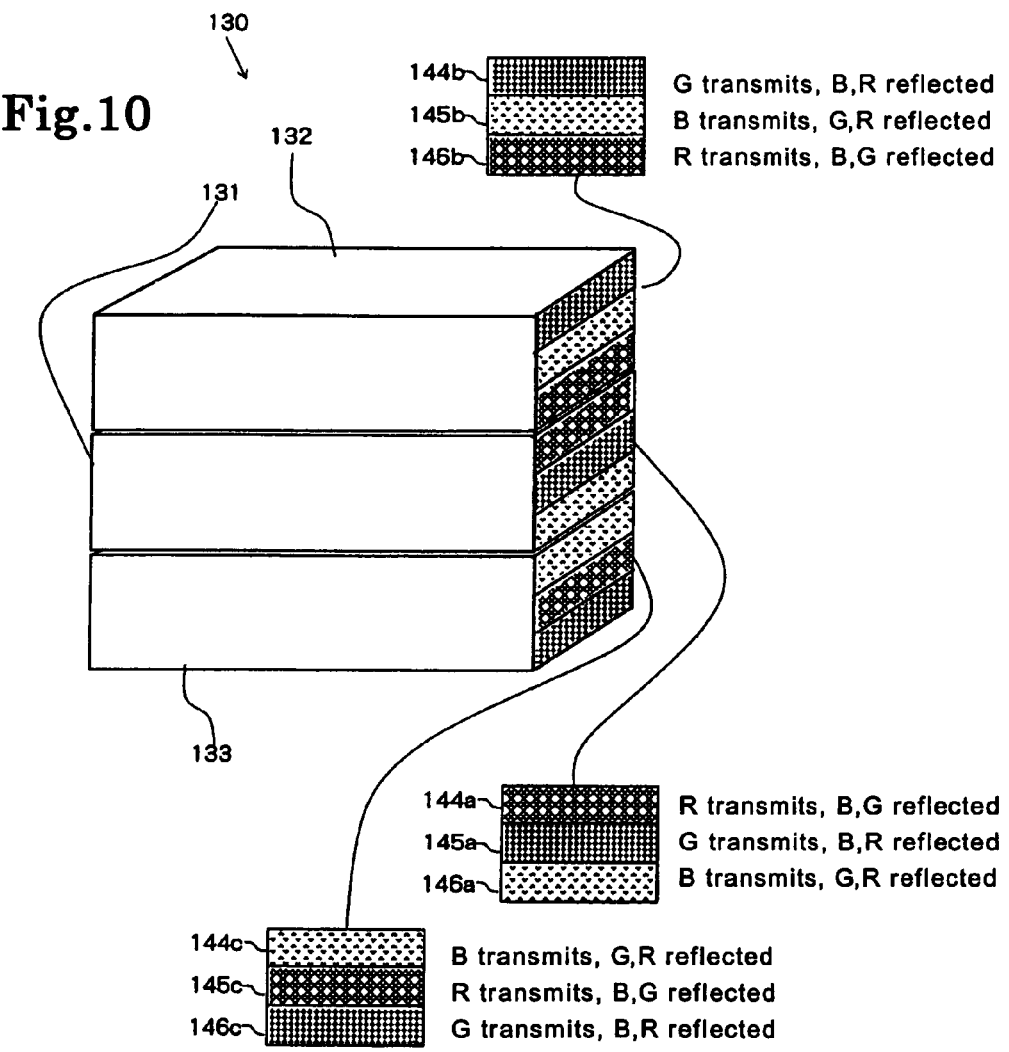
FIG. 10 is a perspective view of a light introducing portion and an arrangement of color bands on emitting surfaces of rod integrators of the light introducing portion according to the second embodiment.

In FIGS. 9A, 9B and 9C, exemplary first rod integrator 131 is shown. Reflective mirrors 138 are formed on the right and left sides of incident surface 134 of first rod integrator 131, as shown in FIG. 9B. Rod integrators 132, 131, 133 are stacked in the vertical direction, as shown in FIG. 10, allowing incident beam 14 to vertically scan the rod integrators except for reflective mirrors 138. Three dichroic filters, i.e., first dichroic filter 144, second dichroic filter 145, and third dichroic filter 146, are formed on emitting surfaces 135. Dichroic filters are designed such that the divided areas of emitting surface 135, which occupy, for example, one-third, respectively, allow beams of colors which are different to each other to be transmitted.

As shown in FIG. 10, second rod integrator 132, first rod integrator 131, and third rod integrator 133, which constitute light introducing portion 130, are arranged vertically. Dichroic filters 144, 145, 146 are formed on each emitting surface 135 of three rod integrators 131, 132, 133 in the same direction as the rod integrators are stacked. Dichroic filters 144, 145, 146 allow one color beam to be transmitted and to reflect the other color beams such that the order of the color in each rod integrator differs from the others. Accordingly, three rod integrators 131, 132, 133 generate color bands with colors arranged in a different order on the respective emitting surfaces 135. The configuration of FIG. 10 provides the same effect as the first embodiment that is explained with reference to FIGS. 5A to 5C. Rod integrators are arranged vertically in this embodiment, compared with the first embodiment in which rod integrators are arranged horizontally. Thus, rotatable prism 20 is rotated about a rotating axis that is inclined by 90 degrees compared to that of the first embodiment.

By virtue of reflective mirrors 138 which are arranged on incident surface 134, the color beams which are not allowed to be transmitted through dichroic filters 144, 145, 146 at emitting surface 135 are re-used inside rod integrators 131, 132, 133.

Similar to the first embodiment, the color beams which are emitted from emitting surface 135 of rod integrators 131, 132, 133 are projected onto display panel 60 through illumination lens 50, such that different color beams are sequentially projected onto each of the divided display areas of display panel 60. Accordingly, all the beam that is generated by light source 11 contributes to illuminate display panel 60 without being wasted at any time. Therefore, full color images with uniform brightness distribution are provided by optical system 1. Further, since light introducing portion 30 has the function of generating color bands as well, a reduction in the number of elements, and thus a compact design, can be achieved.

Figure 11:
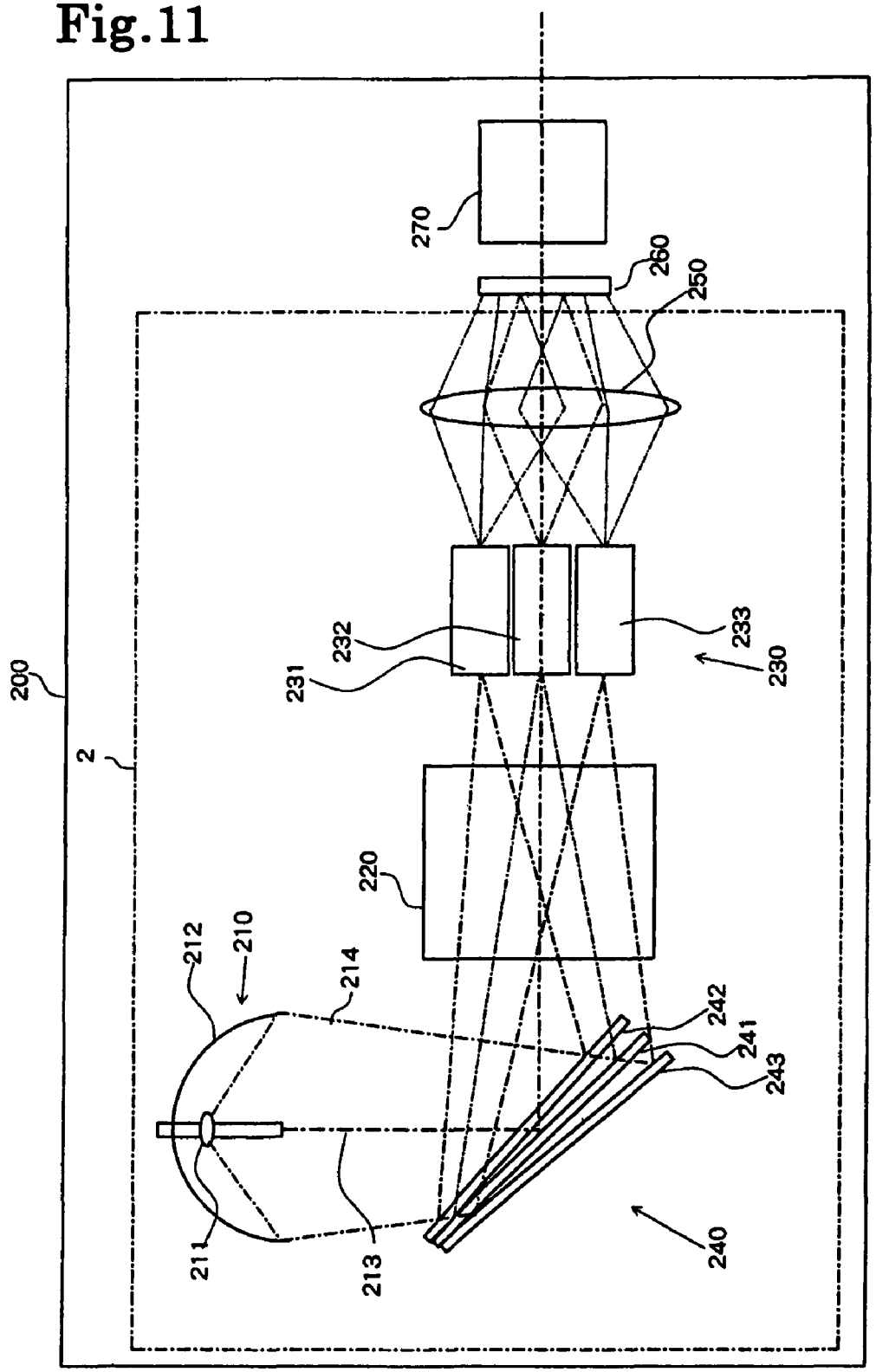
FIG. 11 is a schematic diaphragm of an optical system according to the third embodiment of the present invention and a projector provided with the optical system.

Next, explanation will be given of an optical system of the third embodiment according to the present invention. Referring to FIG. 11, optical system 2 includes light source portion 210, color separating portion 240, rotatable prism 220, light introducing portion 230, and illumination lens 250. Light source portion 210 includes light source 211 which projects beam 214, and reflector 212 which makes beam 214 converge at a predetermined position on optical axis 213. Color separating portion 240, which functions as color separating portion, includes color separating members, i.e., first dichroic mirror (G) 241, second dichroic mirror (R) 242, and reflective mirror 243. Rotatable prism 20 functions as projecting means. Light introducing portion 230, which functions as light introducing means, includes light introducing members, i.e., first rod integrator 231, second rod integrator 232, and third rod integrator 233. Illumination lens 250 makes the color beams, which are emitted from rod integrators 231, 232, 233 of light introducing portion 230, converge on display panel 260.

Light source 211 may be, but is not limited to, a high-pressure mercury lamp for emitting a white light beam having a high brightness. Light source 211 is combined with reflector 212. Reflector 212 has an oval mirror to generate a beam that will converge at a predetermined position. As described in the first embodiment, a reflector with a parabolic surface also may be used.

Beam 214 that is emitted from light source 211 and reflector 212 converges on optical axis 213 of light source 211. Color separating portion 240 which functions as color separating means is arranged at the converging beam. Color separating portion 240 is provided, for example, with second dichroic mirror 242 to reflect the beam of R and to allow the transmission of the beam of G and B, first dichroic mirror 241 to allow the transmission of the beam of B and to reflect the beam of G, and with reflective mirror 243. A dichroic mirror to reflect the beam of B may be used instead of reflective mirror 243. This combination of mirrors is only an example, and other designs for a color separating portion are possible using any optical elements that are capable of separating a white light beam into three color beams and of reflecting the separated beams. Beam 214 is not limited to a white light beam, and any beam may be used which can be separated into three colors beams.

In one embodiment, first dichroic mirror 241 is arranged at an angle of 45 degrees with respect to optical axis 213 of light source lamp 211, second dichroic mirror 242 is arranged at an angle of 41 degrees, and reflective mirror 243 is arranged at an angle of 49 degrees, respectively. This arrangement allows each color beam, which is reflected by each optical member, to converge on the corresponding incident surface of three rod integrators 231, 232, 233 of light introducing portion 230. The positional relationship among light source portion 210, color separating portion 240, and the three rod integrators of light introducing portion 230 may be modified such that each beam 214 that is emitted from color separating portion 240 is converged on each of the three rod integrators 231, 232, 233.

Converged beams of R, G, B which are separated by color separating portion 240 are converged at three points, one of which is on the optical axis, and the other two are in a plane perpendicular to the optical axis. The incident surfaces of rod integrators 231, 232, 233, which function as the light introducing members of light introducing portion 230, are arranged near the converged points. The light introducing members are not limited to rod integrators, and any optical elements may be used which are capable of emitting light with uniform brightness distribution. The brightness distribution needs not be completely uniform. Rotatable prism 220, which is a projecting means, is arranged between color separating portion 240 and light introducing portion 230.

Figure 12A:
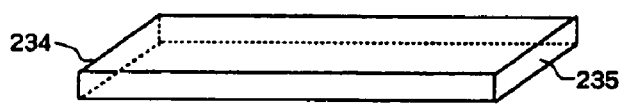
FIG. 12A is a perspective view of a rod integrator according to the third embodiment.
Figure 12B:
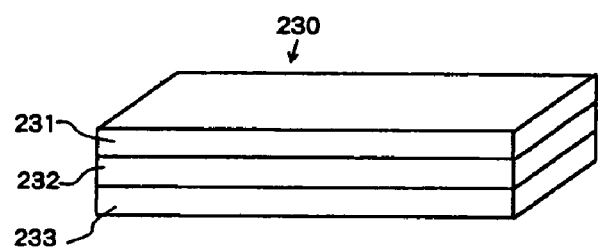
FIG. 12B is a perspective view of a light introducing portion in which three rod integrators are combined.
Figure 13A:
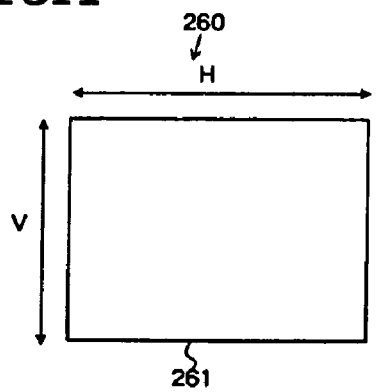
FIG. 13A is a schematic view of a display area of a display panel.
Figure 13B:
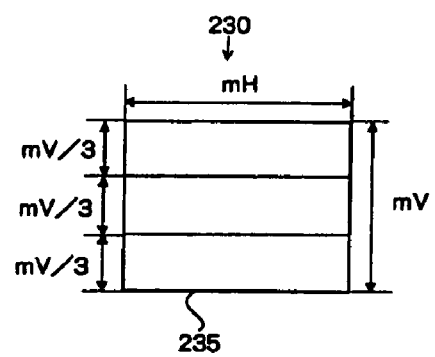
FIG. 13B is a schematic view of emitting surfaces of rod integrators.

Referring to FIG. 12B, light introducing portion 30 includes three rod integrators, i.e., first rod integrator 231, second rod integrator 232 and third rod integrator 233. As shown in FIG. 12A, each rod integrator is a prism-shaped optical element made of optical glass which has incident surface 234, emitting surface 235, and four side surfaces. Each surface is preferably ground. Three rod integrators 231, 232, 233 are preferably integrated such that opposing sides are adhered together with no optical adverse effect, as shown in FIG. 12B. The surfaces of rod integrators 231, 232, 233 which are to be adhered together are preferably coated with reflective films by means of evaporation. If reflective films are coated on both surfaces of second rod integrator 232 by means of evaporation, reflective films do not need to be coated on the surfaces of first rod integrator 231 and third rod integrator 233. Preferably, the aspect ratio of emitting surfaces 235 of the integrated rod integrators is approximately equal to that of display area 261 of display panel 260. For example, if the size of display area 261 of display panel 260 is represented by horizontal dimension H and vertical dimension V, as shown in FIG. 13A, then it is preferable that the emitting surfaces of rod integrators have horizontal dimension mH and vertical dimension mV, as shown in FIG. 13B, where m is an arbitrary coefficient. It is preferable that the emitting surfaces of integrator 231, 232, 233, which together constitute the entire light introducing portion 230, have vertical dimensions of mV/3, respectively.

Illumination lens 250 is arranged just ahead of light introducing portion 230. The beams of three color bands that are projected from illumination lens 250 are incident on display area 261 of display panel 260 which is arranged ahead of lens 250, and generate three divided areas on display area 261 which are vertically arranged. The image formed on display panel 260 is projected and enlarged through projection lens 270 to be displayed on a projection screen, not shown, by projector 200. In this way, illumination lens 250 projects the color beams which are emitted from the emitting surfaces of rod integrators 231, 232, 233 onto display panel 260.

Display panel 260 may be, in addition to a transmission-type liquid crystal panel of a single plate, a reflective display panel as well, such as DMD or LCoS (Liquid Crystal on Silicon).

Next, explanation will be given of the operation of optical system 2. As shown in FIG. 11, beam 214 of white light that is emitted from light source 211 converges through reflector 212 having an oval surface. The converged beam is then separated into three converged beams R, G, B by means of color separating portion 240. Beam 214 is not limited to white light, and any lights may be used that can be separated into three color beams.

Color separating portion 240 consists of first dichroic mirror 241 to reflect a beam of G that is inclined at 45 degrees with regard to optical axis 213 of light source lamp 211, second dichroic mirror 242 to reflect a beam of R that is inclined at −4 degrees with regard to first dichroic mirror 241, and reflective mirror 243 that is inclined at +4 degrees with regard to first dichroic mirror 241. Of the white light beam incident on color separating portion 240, a beam of G is reflected by first dichroic mirror 241 at an angle of 90 degrees. A beam of R is reflected by second dichroic mirror 242 at an angle of −8 degrees with regard to the beam of G. A beam of B is reflected by reflective mirror 243 by an angle of +8 degrees with regard to the beam of G. In this way, the converging light beam that is emitted from the light source is separated into three converged beams of R, G, B. Three converged beams of R, G, B are incident on incident surfaces 234 of three rod integrators 231, 232, 233 of light introducing portion 230, respectively. Rotatable prism 220 is arranged between color separating portion 240 and light introducing portion 230. The convergent points of the converged beams move in a direction perpendicular to the optical axis in accordance with the rotation of rotatable prism 220.

Figure 14A:
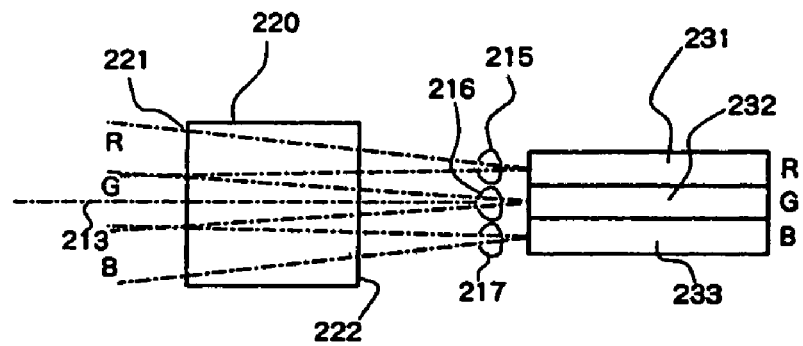
FIGS. 14A, 14B, and 14C are schematic views showing relationships between the rotating angle of a rotatable prism and the incidence of three converged beams on rod integrators.

As shown in FIG. 14A, when incident surface 221 of rotatable prism 220 is perpendicular to optical axis 213, the beam of R 215, the beam of G 216, and the beam of B 217 which are emitted from color separating portion 240 advance without being biased by rotatable prism 220. As a result, the beam of R 215 is incident on first rod integrator 231, the beam of G 216 is incident on second rod integrator 232, and the beam of B 217 is incident on third rod integrator 233.

Figure 14B:
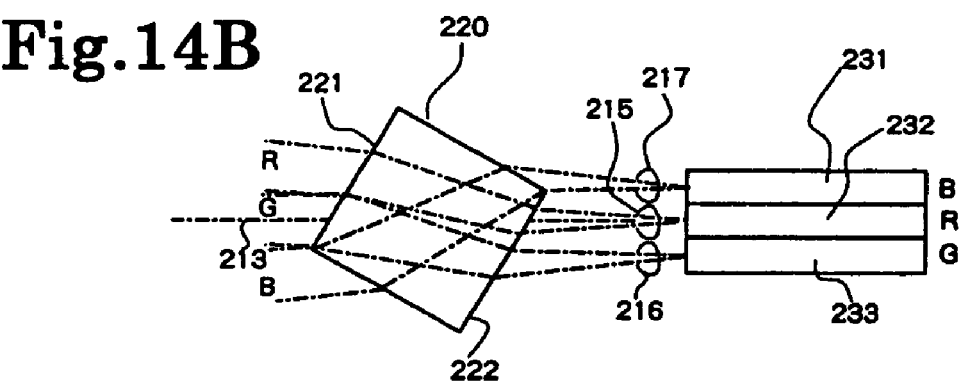

When rotatable prism 220 rotates clockwise, the angle of refraction of each beam at both incident surface 221 and emitting surface 222 of rotatable prism 220 is affected. The beam of R 215 and the beam of G 216 are biased downward while the beam of B 217 is biased upward. Accordingly, as shown in FIG. 14B, the beam of R 215 is incident on second rod integrator 232, the beam of G 216 is incident on third rod integrator 233, and the beam of B 217 is incident on first rod integrator 231.

Figure 14C:
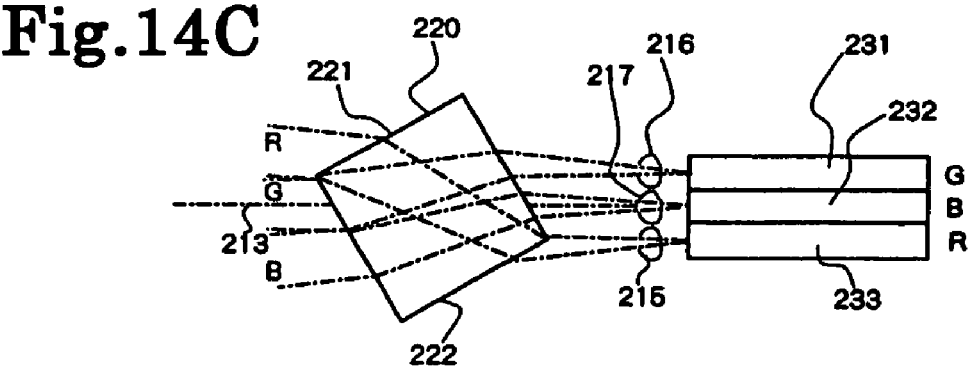

When rotatable prism 220 rotates further, as shown in FIG. 14C, the beam of R 215 is incident on third rod integrator 233, the beam of G 216 is incident on first rod integrator 231, and the beam of B 217 is incident on second rod integrator 232. When rotatable prism 220 rotates further, the convergent point returns to the position shown in FIG. 14A.

As described above, as rotatable prism 220 rotates, the color beams incident on first rod integrator 231, second rod integrator 232, and third rod integrator 233 are periodically switched. This periodical switching, namely, scanning with three color beams by means of rotatable prism 220 is preferably performed at a substantially constant speed. For that purpose, the rotation axis is preferably positioned at the center of rotatable prism 220, and rotatable prism 220 is preferably rotated at a constant speed.

Even if the incident points of the color beams on rod integrators 231, 232, 233 vary, sufficiently uniform brightness distribution can be obtained on emitting surface 335 of rod integrators through internal reflection inside the rod integrators.

In FIG. 14A, color bands of R, G, B are formed in this order from top to bottom on the emitting surface of the rod integrator. In FIG. 14B, color bands of B, R, G are formed in this order from top to bottom. In FIG. 14C, color bands of G, B, R are formed in this order from top to bottom.

The color beams that are emitted from emitting surfaces 235 of light introducing portion 230 are projected onto display panel 260 through illumination lens 250. Referring to FIG. 15, the color beam that is emitted from the emitting surface of first rod integrator 231 is projected onto first area 261a in display area 261 of display panel 260. The color beam that is emitted from the emitting surface of second rod integrator 232 is projected onto second area 261b. The color beam that is emitted from the emitting surface of third rod integrator 233 is projected onto third area 261c.

As described above, the color of beams which are incident on first rod integrator 231, second rod integrator 232, and third rod integrator 233 changes as rotatable prism 220 rotates. Rotatable prism 220 is rotated at a predetermined speed, and the timing for projecting the color beams on first area 261a, second area 261b, and third area 261c in display area 261 and the timing for driving display panel 260 are synchronized to display full color images.

Referring to FIG. 16, a time for displaying one frame of a picture is represented by T, and times for displaying sub-frames are represented by T1, T2 and T3. The color of the beams which are projected onto first display area 261a of display panel 260 is G during time T1, R during time T2, and B during time T3. In other words, color beams are projected repeatedly in the order of G, R, B, G, R, B. Similarly, color beams are projected repeatedly onto second display area 261b in the order of B, G, R, B, G, R, and color beams are projected onto third display area 261c in the order of R, B, G, R, B, G. Each sub-frame is projected repeatedly by any one of color beams of R, G, B at any one time, and the color of the beam that is projected onto each divided area 261a, 261b, and 261c in display area 261 of display panel 260 sequentially changes. Accordingly, all the beam that is generated by light source 211 is used to illuminate display panel 260 without being wasted at any time, resulting in sufficiently high efficiency for light utilization. Moreover, light in the form of color bands which are formed by rod integrators 231, 232, 233 is projected onto display panel 260 with uniform brightness, allowing images to be enlarged and projected through projection lens 250 with uniform brightness and with high quality. Therefore, by synchronizing the timing for projecting the color beams onto first area 261a, second area 261b, and third area 261c in display area 261 and the timing for driving display panel 260, full color images with uniform brightness and with high efficiency can be achieved.

The rod integrators of light introducing portion 230 may be variously modified in addition to the above-mentioned configuration. Referring to FIGS. 17A and 17B, in one embodiment, light introducing portion 430 consists of three rod integrators, i.e., first rod integrator 431, second rod integrator 432, and third rod integrator 433. Second rod integrator 432 has a shorter length than the others. Surfaces 437a and 437b of first rod integrator 431 and third rod integrator 433 are bound together via reflective films. This configuration makes the boundaries in emitting surfaces 435 of the three rod integrators, namely, the boundaries between first display area 261a and second display area 261b, and between second display area 261b and third display area 261c in display area 261 of display panel 260, more inconspicuous, resulting in improved quality of the displayed images.

Next, explanation will be given of an optical system of the fourth embodiment according to the present invention. The fourth embodiment is a modification of the third embodiment. Configuration and operations are similar to those of the third embodiment except for light introducing portion 230, and detailed explanation of the similar portions will be omitted.

Figure 18A:
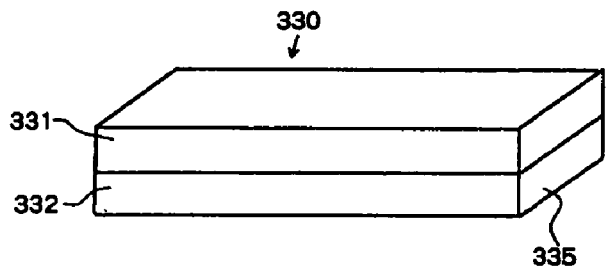
FIG. 18A is a perspective view of a light introducing portion according to the fourth embodiment.
Figure 18B:
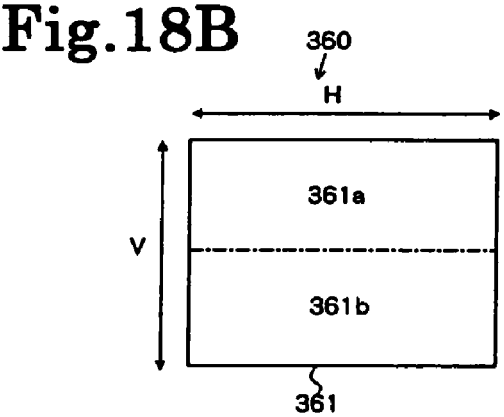
FIG. 18B is a schematic view of a display area of a display panel.
Figure 18C:
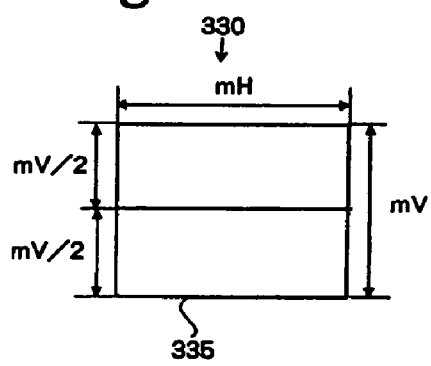
FIG. 18C is a schematic view of the emitting surfaces of rod integrators.

In optical system 2 according to the third embodiment, integrated light introducing portion 230 that includes three rod integrators is used. Three color bands, in which the order of color changes sequentially, are formed on emitting surfaces of the rod integrators, and the color bands are projected onto display panel 260 at any one time. Referring to FIG. 18A, integrated light introducing portion 330 of the fourth embodiment includes two rod integrators 331, 332. If the size of a display panel is represented by horizontal dimension H and vertical dimension V, as shown in FIG. 18B, then it is preferable that each emitting surface of the rod integrators has horizontal dimension mH/2 and by vertical dimension mV/2, as shown in FIG. 18C. The color beams which are emitted from emitting surfaces 335 of first rod integrator 331 and second rod integrator 332 are projected onto display panel 360, and thus different color beams are repeatedly projected onto first display area 361a and second display area 361b in display area 361 of display panel 360.

Figure 19:
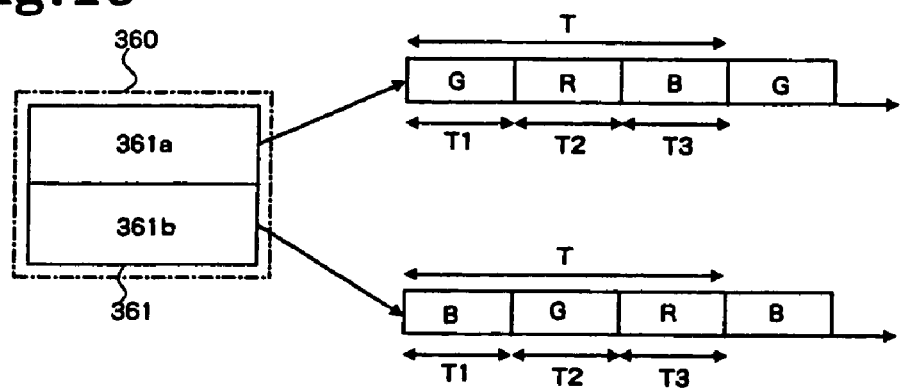
FIG. 19 is a schematic view explaining the time-dependent change in the color of beams which are projected onto a display area in a display panel according to the fourth embodiment.

Referring to FIG. 19, the color beam that is projected onto display area 361a of display panel 360 changes in the order of G(T1), R(T2), B(T3) in time T. In second display area 361b, the color beam changes in the order of B(T1), G(T2), R(T3) in time T. Therefore, full color images can be displayed by synchronizing the timing for projecting color beams onto first area 361a and second area 361b and the timing for driving display panel 360.

In this embodiment, two color beams out of three beams of R, G, B which are generated in color separating portion 240 are incident on two rod integrators, i.e., first rod integrator 331 and second rod integrator 332 at any one time. Accordingly, the fourth embodiment is less advantageous than the third embodiment as regards the efficiency use of light. However, the fourth embodiment is significantly advantageous in view of efficiency for light utilization, as compared to a conventional color wheel system in which two-thirds of light is wasted at any time, because the loss of light is reduced to one-third. Further, since color bands are periodically projected for two-divided screen display areas 361a and 361b, a longer time for displaying images can be ensured for each sub-frame time compared with the third embodiment. Since color bands remain unchanged during each sub-frame time, it is possible to achieve sufficient gradations of color without complicated PWM control. As a result, high quality images can be displayed with a smaller burden on the signal processing circuit.

Next, a fifth embodiment of the present invention, which is a projector having the optical system according to the present invention, will be explained with reference to FIGS. 1 and 11. Projector 100 in FIG. 1 is provided with optical system 1 according to the first or second embodiment. The color beams consisting of a plurality of color bands which are generated through color separation are sequentially switched and projected onto divided areas 61 of display panel 60 from optical system 1. Display panel 60 is driven in synchronization with the color beams which are projected. Display panel 60 displays color images, and the color images which are displayed are projected from projector 100 through projection lens 70 onto a projection screen that is provided outside.

Projector 200 in FIG. 11 is provided with optical system 2 according to the third or fourth embodiment. The color beams consisting of a plurality of color bands, which are generated through color separation, are sequentially switched and projected onto divided areas 261 of display panel 260 from optical system 2. Display panel 260 is driven in synchronization with the color beams that are projected. Display panel 260 displays color images, and the color images which are displayed are projected from projector 200 through projection lens 270 onto a projection screen that is provided outside.

Figure 20A:
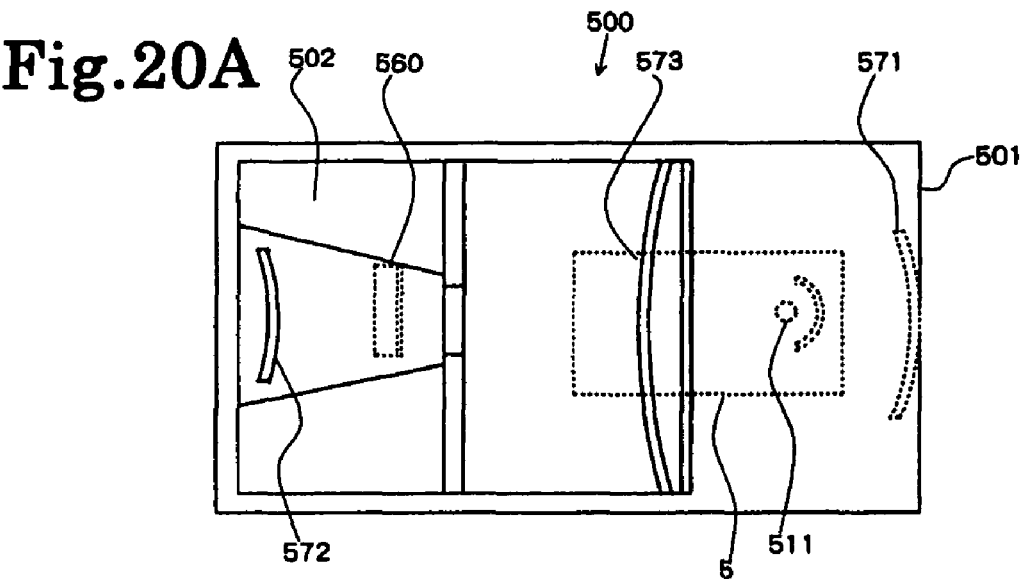
FIG. 20A is a top view of a projector according to the fifth embodiment.
Figure 20B:
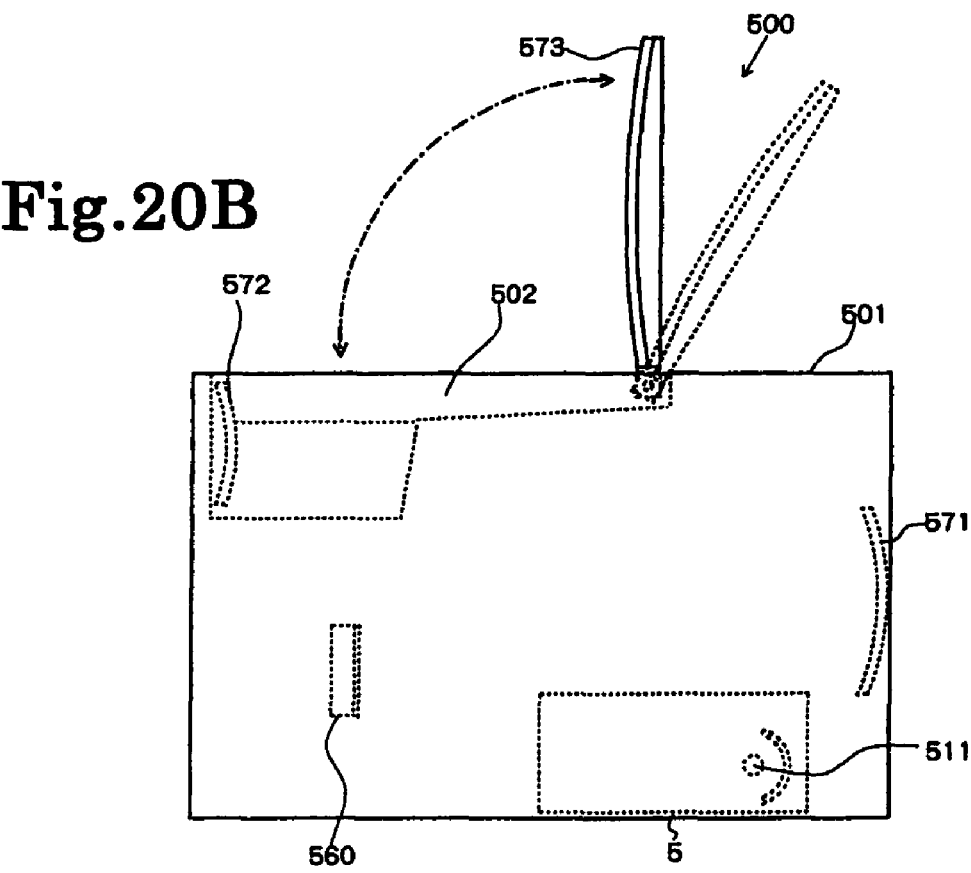
FIG. 20B is a side view of the projector shown in FIG. 20A.

Recently, as shown in FIGS. 20A and 20B, projectors of an aperture projection type for projecting large images at a short distance with an ultra short focal length have been developed. The optical system of the present invention is also applicable to a projector of the aperture projection type.

Projector 500 has reflective-type display panel 560, optical system 5, reflective mirrors 571, 572, projection mirror 573, and housing 501 that houses reflective display panel 560 and optical system 5. Any embodiment from the first to the fourth embodiments may be used for optical system 5. Optical system 5 includes light source 511, and sequentially switches and projects color beams, which consist of a plurality of color bands and which are generated through color separation, on divided areas of reflective-type display panel 560. Reflective mirrors 571, 572, and projection mirror 573 project light that is modulated by reflective-type display panel 560 onto an external screen, not shown. Aperture 502 is arranged between reflective-type display panel 560 in housing 501 and projection mirror 573. Color beams are projected from reflective display panel 560 onto projection mirror 573 through aperture 502. Projection mirror 573 is attached to housing 501 with one end supported by a hinge. The other end is configured to be retractable and extractable with regard to the upper side of housing 501. Projection mirror 573 constitutes part of the projection optical system when extracted, and works as a lid for shutting aperture 502 when retracted.

Although certain preferred embodiments of the present invention have been shown and described in detail, it should be understood that various changes and modifications may be made without departing from the sprit or scope of the appended claims.

What is claimed is:

1. An optical system for a display panel comprising:
   a light source;
   a color separating portion for separating light that is emitted from the light source into a plurality of beams having different spectra; and
   a projecting portion for projecting the plurality of beams onto a plurality of divided areas of a predetermined range in the display panel, while sequentially switching the plurality of beams;
   wherein the color separating portion comprises:
      three light introducing members each for emitting the light that is incident from the light source through an emitting surface;
      a selecting portion that is arranged on an optical path between the light source and the three light introducing members, for selecting only one of the three light introducing members and for causing the light to be incident on the selected light introducing member; and
      three color separating members which are arranged on the emitting surface of each of the three light introducing members, said three color separating members for separating the light into three color beams, colors of the three color beams, generated by the three color separating members, being in a different order from each other,
   wherein the projecting portion further comprises a projecting means for projecting the three color beams which are emitted from the three color separating members onto the plurality of divided areas.

2. The optical system for the display panel according to claim 1, wherein each beam has a rectangular cross-section in a plane perpendicular to a direction that the beam travels, and wherein each beam is emitted such that the beam borders on a longer side of an adjacent beam, and such that the plurality of beams have a different spectra order depending on the color separating members.

3. The optical system for the display panel according to claim 2, wherein a ratio of a total length of shorter sides of the plurality of beams to a length of a longer side of a beam is approximately equal to a ratio of a length of a shorter side of the predetermined range of the display panel to a length of a longer side of the predetermined range.

4. The optical system for the display panel according to claim 1, wherein the plurality of beams comprise a beam of red, a beam of green, and a beam of blue.

5. The optical system for the display panel according to claim 4, wherein a light introducing portion includes the three light introducing members, wherein:
   the beams which are emitted from the color separating member that is connected to the emitting surface of a first light introducing member are spatially arranged in an order of red, green and blue,
   the beams which are emitted from the color separating member that is connected to the emitting surface of a second light introducing member are spatially arranged in an order of green, blue, and red, and
   the beams which are emitted from the color separating member that is connected to the emitting surface of a third light introducing member are spatially arranged in an order of blue, red, and green.

6. The optical system for the display panel according to claim 1, wherein incident surfaces of the three light introducing members are arranged on a same plane.

7. The optical system for the display panel according to claim 1, wherein a brightness distribution of the light is made uniform by the three light introducing members.

8. The optical system for the display panel according to claim 1, wherein the one of the three light introducing members comprises a rod integrator.

9. The optical system for the display panel according to claim 1, wherein the color separating portion includes a dichroic mirror or a dichroic prism.

10. The optical system for the display panel according to claim 1, wherein the selecting portion makes the light sequentially incident on the selected light introducing member.

11. The optical system for the display panel according to claim 10, wherein the selecting portion includes a rotatable prism.

12. The optical system for the display panel according to claim 1, wherein the color separating portion further comprises:
   color separating means including the three color separating members, the color separating means for separating the light that is emitted from the light source into the three color beams;
   a light introducing portion which includes the three light introducing members each for emitting the beam through an emitting surface, the beam being emitted from the color separating means and incident on the light introducing portion;
   the selecting portion that is arranged on an optical path between the light source and the light introducing portion, for causing the three color beams which are emitted from the color separating portion incident on one of the light introducing members; and
   a projecting portion for projecting the beams which are emitted from the light introducing portion on a predetermined range of the display panel.

13. The optical system for the display panel according to claim 12, wherein each beam has a rectangular cross-section in a plane perpendicular to a direction that the beam travels, and wherein each beam is emitted such that each beam borders on a longer side of an adjacent beam.

14. The optical system for the display panel according to claim 12, wherein a ratio of a total length of shorter sides of the plurality of beams to a length of the longer side of a beam is approximately equal to a ratio of a length of a shorter side of the predetermined range of the display panel to a length of a longer side of the predetermined range.

15. The optical system for the display panel according to claim 12, wherein the three color beams which are generated by the color separating portion comprise a beam of red, a beam of green, and a beam of blue.

16. The optical system for the display panel according to claim 12, wherein each color separating member reflects only a predetermined wavelength range, and is arranged at an orientation so that the reflected light is incident on the corresponding light introducing member.

17. The optical system for the display panel according to claim 16, wherein the color separating portion includes a first dichroic mirror for reflecting a beam of red and for allowing a beam of green and a beam of blue to be transmitted, a second dichroic mirror for reflecting the beam of green and for allowing the beam of blue to be transmitted, and a reflective mirror for reflecting the beam of blue.

18. The optical system for the display panel according to claim 12,
   wherein the three color beams comprise a beam of red, a beam of green and a beam of blue,
   wherein the beam that is emitted from the color separating portion is incident on a first light introducing member sequentially in an order of red, green, and blue by the selecting portion,
   wherein when the beam of red is incident on the first light introducing member, the beam of green is incident on a second light introducing member and the beam of blue is incident on a third light introducing member, and when the beam of green is incident on the first light introducing member, the beam of blue is incident on the second light introducing member and the beam of red is incident on the third light introducing member, and when the beam of blue is incident on the first light introducing member, the beam of red is incident on the second light introducing member and the beam of green is incident on the third light introducing member.

19. The optical system for the display panel according to claim 12,
   wherein the beam that is emitted from the color separating portion is incident on a first light introducing member sequentially in an order of green, red, and blue by means of the selecting portion,
   wherein when the beam of green is incident on the first light introducing member, the beam of blue is incident on the second light introducing member,
   wherein when the beam of red is incident on the first light introducing member, the beam of green is incident on a second light introducing member,
   wherein when the beam of blue is incident on the first light introducing member, the beam of red is incident on the second light introducing member.

20. The optical system for the display panel according to claim 12, wherein incident surfaces of the three light introducing members are arranged on a same plane.

21. The optical system for the display panel according to claim 12, wherein a brightness distribution of the light is made uniform by the three light introducing members.

22. The optical system for the display panel according to claim 13, wherein the light introducing portion comprises a rod integrator.

23. The optical system for the display panel according to claim 12, wherein each beam that is separated by the color separating portion is incident on each light introducing member in a sequential and circulatory manner by the selecting portion.

24. The optical system for the display panel according to claim 23, wherein the selecting portion includes a rotatable prism.

25. A projector comprising a display panel and the optical system according to claim 1.

26. A projector comprising a display panel and the optical system according claim 12.

* * * * *